Figure 3:
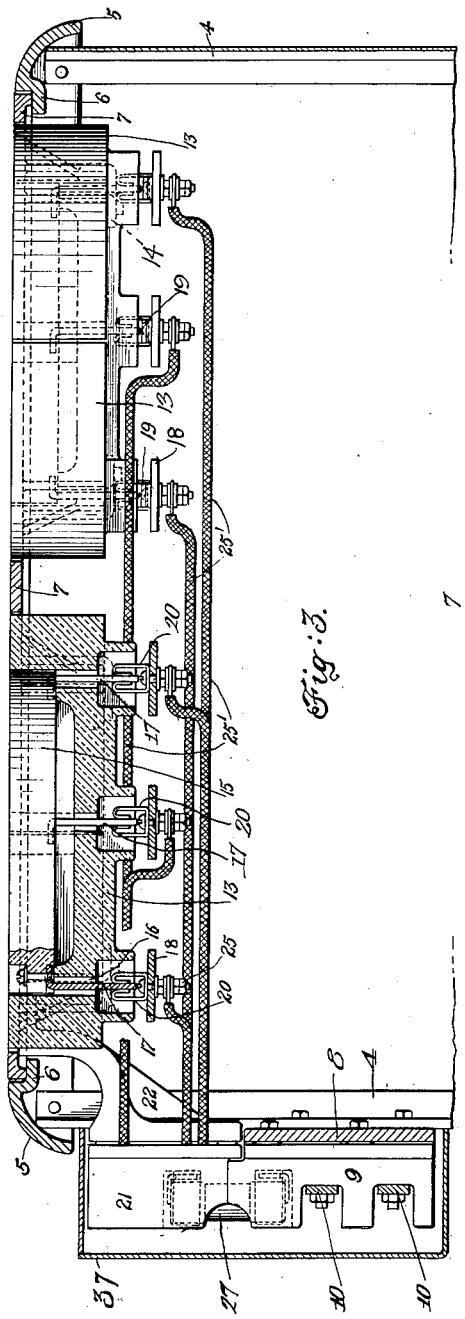

J. LAWRENCE.
ELECTRIC HEATING DEVICE.
APPLICATION FILED NOV. 19, 1915.
1,177,253.
Patented Mar. 28, 1916.
3 SHEETS—SHEET 1.
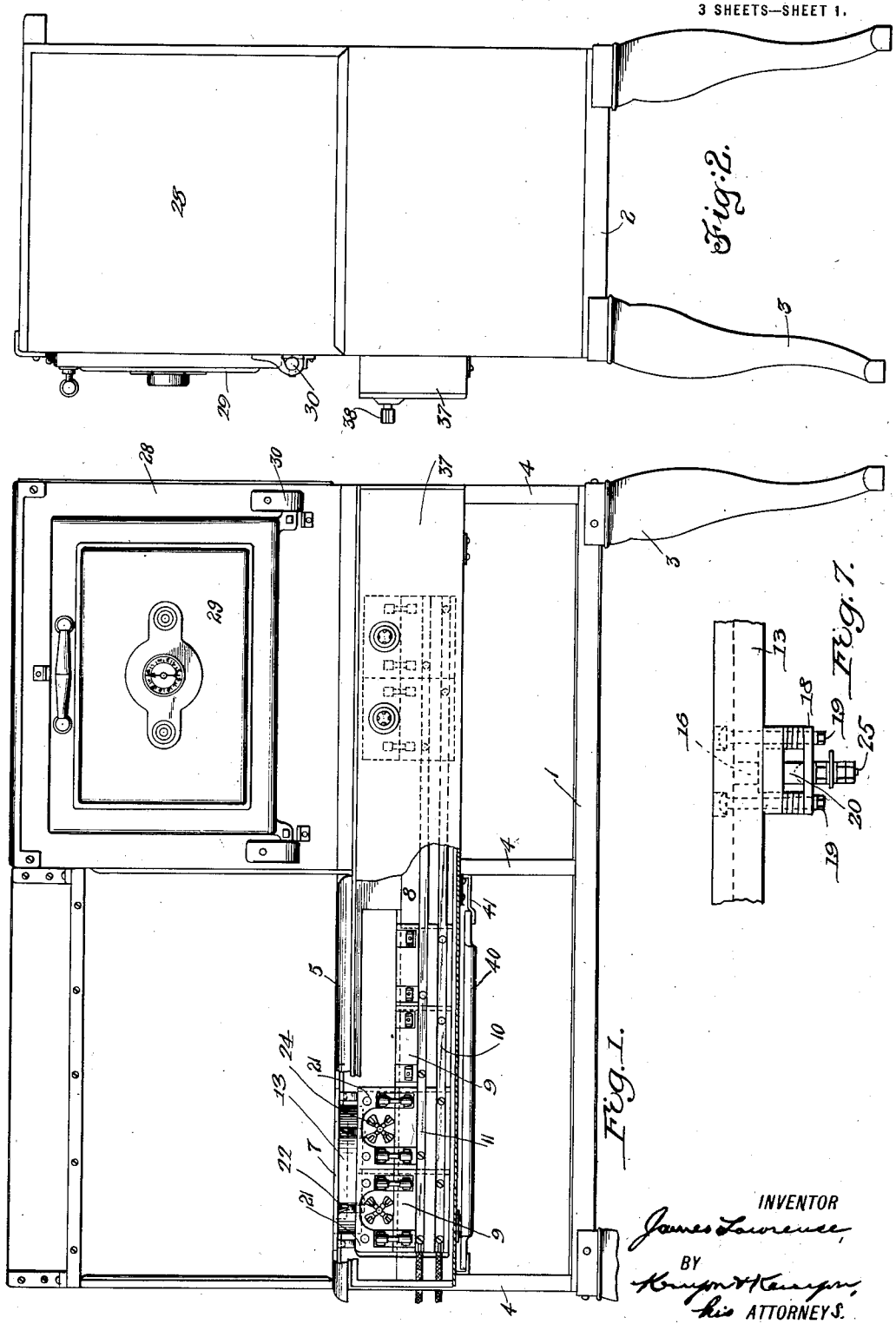

J. LAWRENCE.
ELECTRIC HEATING DEVICE.
APPLICATION FILED NOV. 19, 1915.

1,177,253.

Patented Mar. 28, 1916.
3 SHEETS—SHEET 2.

INVENTOR
James Lawrence,
BY
Kenyon & Kenyon
his ATTORNEYS.

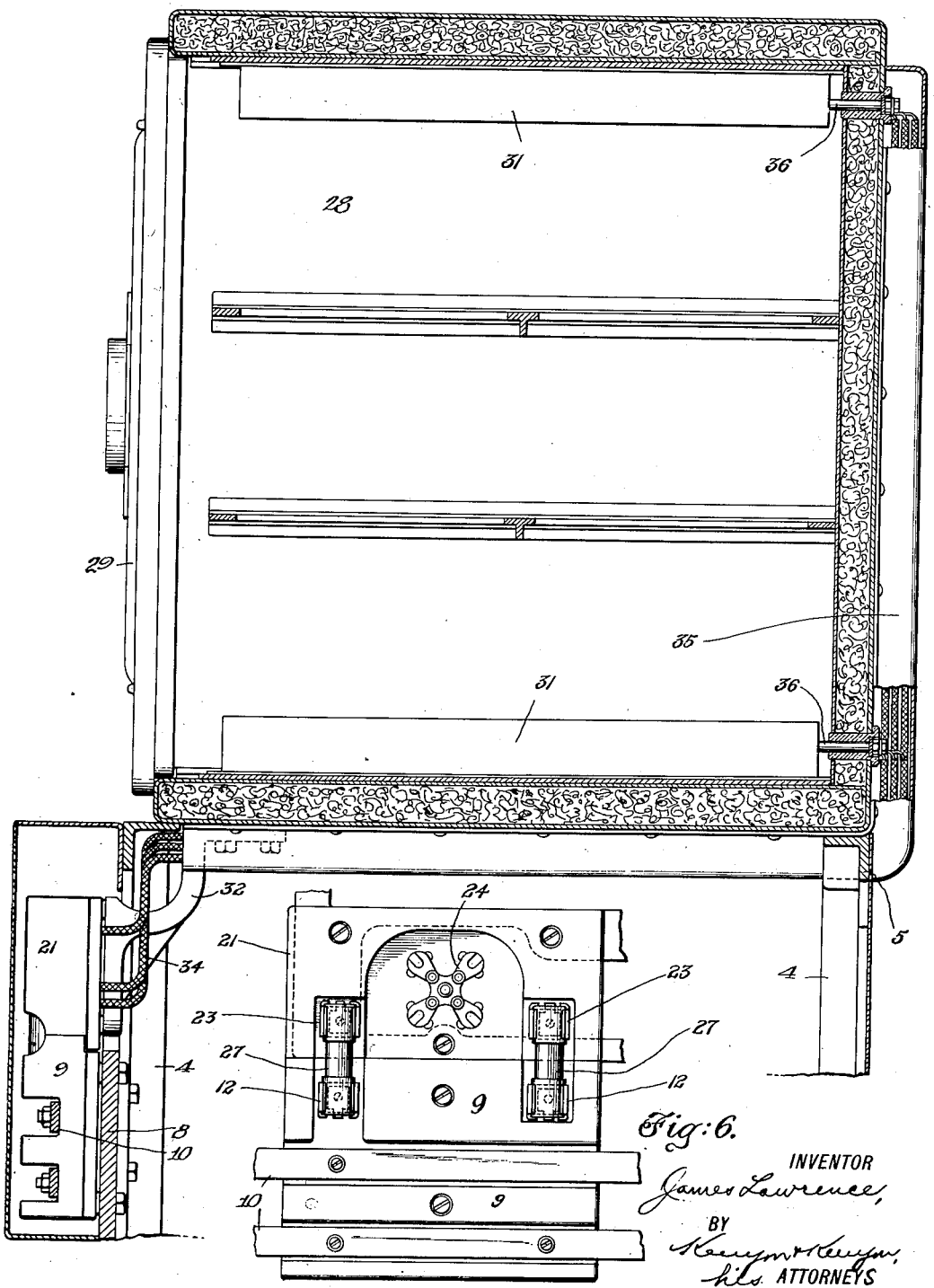

UNITED STATES PATENT OFFICE.

JAMES LAWRENCE, OF NEW YORK, N. Y., ASSIGNOR TO STANLEY G. RANGER, OF NEW YORK, N. Y.

ELECTRIC HEATING DEVICE.

1,177,253.  Specification of Letters Patent. Patented Mar. 28, 1916.

Application filed November 19, 1915. Serial No. 62,312.

*To all whom it may concern:*

Be it known that I, JAMES LAWRENCE, a subject of the King of Great Britain, and a resident of the borough of Manhattan, city, county, and State of New York, have invented certain new and useful Improvements in Electric Heating Devices, of which the following is a specification.

My invention relates to electric heating devices, and particularly to that type of heating device which includes distinct heating units energized by the flow of electric current.

Electric stoves are rapidly supplanting gas and coal stoves for cooking and heating purposes, and the embodiment of my invention which is herein-described comprises an electric cooking stove the structure of which is simplified by the embodiment therein of my invention. The stove comprises a framework, and on this framework there are mounted electric conductors and connector receptacles connected thereto. Removably mounted on the frame of the stove there are a stove top section and an oven section. These sections carry electric heating units and connector receptacles. The connector receptacles are electrically connected to the heating units. Readily removable connectors are adapted to be accommodated by the receptacles associated with the heating units and by the receptacles associated with the supply conductors. It will be seen that by this structure an electric heating device is provided in which the heating units, together with electric terminals associated therewith, may be readily mounted on or removed from the frame of the stove, and may be readily electrically connected thereto by merely placing readily removable connectors in corresponding receptacles.

One object of my invention is to provide an electric stove which includes heating units which may be removed and replaced as desired and which are electrically disconnected or connected respectively by their mere removal or replacement.

Another object is to provide an electric stove made up of parts joined together in a manner which renders them, on the one hand, readily separable, or, on the other hand, capable of being assembled and connected up electrically at any point at which it is desired to place the stove and without the aid of skilled workmen or the use of special tools.

Another object is to provide means for simply and efficiently electrically connecting the electrical conducting and translating devices of separable parts of an electrically-operated device, such as an electric stove, and, as a further object, to embody in such means a protective element, such as a fuse.

Other and further objects and advantages will appear from the following description, taken in connection with the accompanying drawings, forming a part of this specification, and will be pointed out in the claims.

Figure 4:
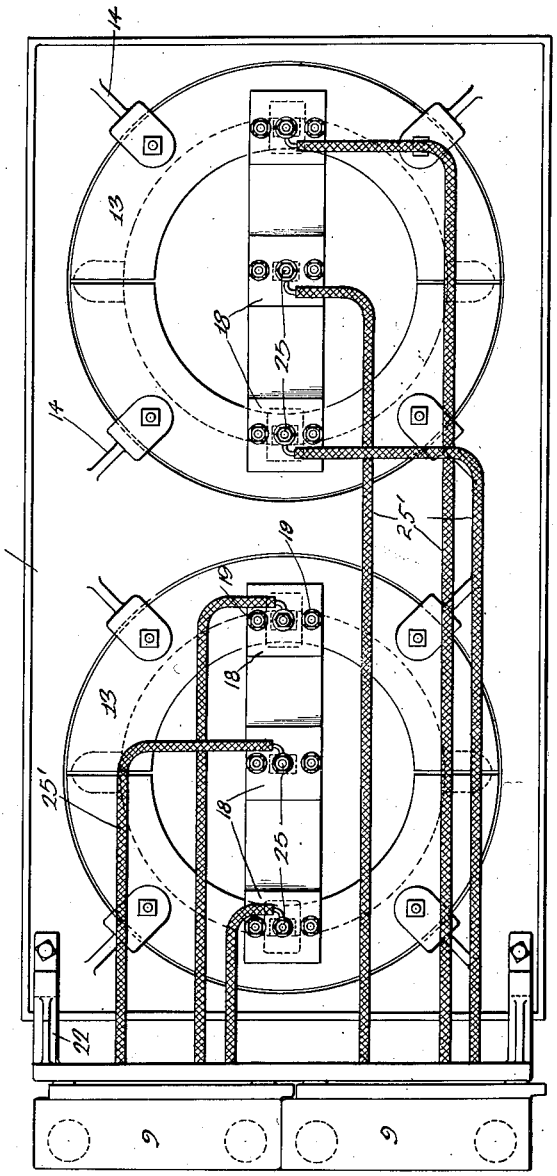

In the drawings, in which like reference characters indicate similar parts, Figure 1 is the front view of an electric heating device, partially broken away, and embodying a preferred form of my invention; Fig. 2 is an end view of the device shown in Fig. 1; Fig. 3 is a partial section through the stove top of the device shown in Fig. 1; Fig. 4 is a view from underneath of the device shown in section in Fig. 3; Fig. 5 is a sectional view through the oven section of the device shown in Fig. 1; Fig. 6 is a detail view of connector receptacle supporting blocks forming a part of my heating device; and Fig. 7 is a partial detail view showing the manner of securing clip contact members to the receiving member.

In the embodiment of my invention which is herein disclosed for the purpose of interpreting my invention, the heating device comprises a supporting frame, which includes horizontal members 1, 2, and which is supported upon legs 3. Supported by the horizontal members 1 and 2, there are vertical members 4, and upon the vertical members 4 there is supported a rim member 5, which completely encircles the top part of the stove, and upon which the heating sections of the stove are mounted. The rim member has a depressed ledge 5 around a part of its inner edge, and upon this ledge the stove top sections 7 are mounted. Across the front of the frame and attached to the vertical members thereof is a front plate 8, and upon this front plate 8 there is mounted a series of insulating blocks 9, and upon these insulating blocks there are supported conductors or bus-bars 10. Upon each of the blocks, there are mounted two spring clips or receptacles 12, which may be of any type now well known, and which are adapted to receive one end of a connector, such as a fuse plug. These clips are formed of resilient material, so that the fuse plug may be sprung into them and firmly but removably held in position. Each clip is connected to one of the bus-bars.

Each stove top section 7 comprises a plate having two openings, in which are positioned heating unit receivers 13, the receivers 13 being supported from the plate by brackets 14. A small space is left between the receivers and the stove top to prevent conduction of heat from the receivers to the stove top. Positioned within the opening in each of the receivers, there is a heating unit 15, which comprises an insulating plate and an element adapted to be heated by resistance. The stove top section and the receivers, therefore, act together to support the heating units. The heating element may be of any type now well known. The receiver has three openings 16, through which pass electrodes 17, which are secured to the heating unit and attached to the heating element mounted thereon. Three plates 18 are supported on the under face of each receiver by bolts 19, and mounted on each plate there is a spring clip contact 20, adapted to receive the electrodes 17 whenever one of the units is dropped into the opening provided for it in the upper face of the receiver. Blocks 21 of insulating material are secured to each stove top section by means of brackets 22, the brackets being of such a shape that, when the stove top occupies its position upon the ledge 6 of the rim 5, the contact blocks 21 are positioned adjacent and may rest upon the blocks 9 of insulating material upon which the bus-bars are mounted. Electric terminals, comprising connector receptacles or clips 23, are mounted upon the blocks 21, and a switch 24 is also mounted upon each block 21. The plates 18 carry binding posts 25, which are connected to the spring clip contacts 20. Electric conducting wires 25' lead from the binding posts 25 to certain contacts of the switch 24. The switch 24 may be of any well known type, so that any portion of the heating element may be heated at will by passing electric current through it. Electric conductors lead from certain of the switch contacts to the connector receptacles or clips 23. The blocks 9 and 21 are so positioned relatively that the receptacles or clips 12 on the block 9 are directly opposite the receptacles or clips 23 on the block 21, and the only thing necessary to be done in order to electrically connect to the bus-bars the conductors which lead to the heating units is to place in the receptacles or clips 12 and 23 a convenient connector 27, which, in the embodiment herein disclosed, comprises a fuse plug of any well known type.

It will be apparent from the structure above described that a stove top section carrying a heating unit receiver and all of the wires which lead to the heating elements, as well as the switch which controls the supply of current to various sections of the heating elements, may be removed together by lifting up the back edge of the stove top and drawing the blocks 21 which are attached to the stove top by the brackets 22 up through the opening in the rim 5. It will be seen, therefore, that the stove top, together with its removable and replaceable units and all the permanent wiring of the stove, may be electrically disconnected from the supply by the removal of connectors, or may be connected to the supply by merely replacing the connectors.

Beneath the stove top section, a drip pan 40 is supported on brackets 41, which are attached to the vertical members of the frame.

Adjacent the stove top section of the heating device, there is an oven 28, which rests upon portions of the rim member 5. The oven is of any well known type, having the door 29 in the front thereof mounted to swing on the hinges 30, and having within it the heating elements 31. Secured to the lower face of the oven by brackets 32, there are insulating blocks 21, which carry the usual switches 24, and the usual clips 23 above-described. These blocks are adapted to be placed adjacent blocks 9, as above-described. The switches on these blocks 21 are connected to the heating members by means of conductors 34, which pass through the conduit 35, which is attached to the back of the oven, and thence through the wall of the oven in insulating tubes 36.

It will be seen from the structure described that the oven may be removed from the heating device as readily as the stove top sections above-described, and that it may be electrically connected or disconnected, respectively, by the positioning or removal of suitable connectors 27.

Covering the blocks 9 and 21, together with their electrical conductors, there is a box member 37, through openings in which extend the switch-operating members 38.

While I have described one embodiment of my invention in great detail, I do not intend to be limited by the specific features referred to, but I intend that modifications, variations and adaptions of my device which may occur to those skilled in the art shall fall within the scope of my invention, and that devices which fulfil the objects of my invention and are defined by the hereunto-appended claims shall be considered as within my invention.

What I claim and desire to secure by Letters Patent of the United States is the following:—

1. In a device of the class described, the combination of a stove top having openings therein, heating unit receiving members of insulating material positioned in said openings and having electric supply contacts, and electric heating units carried by said receiving members and having electrodes adapted to contact with said contacts when said unit is positioned.

2. In a device of the class described, a frame, an electrical conductor supporting member supported thereby, a heating unit supporting member positioned adjacent thereto and supported by said frame, connector receptacles on said members, and connectors extending respectively from the receptacles on one of said members to the connectors on the other.

3. In a device of the class described, an electrical conductor carrying front plate, a contact block positioned adjacent thereto, an electrical heating unit support joined to said last-named block, electric current control devices carried by said contact block, electrical connector receptacles mounted on said plate and block, and connectors extending from the receptacles of said plate respectively to those of said block.

4. In a device of the class described, a frame, an electric conductor supporting member attached thereto, an electric control device supporting member positioned adjacent thereto, receptacles for electrical connectors on each of said members, connectors extending from the receptacles of one of said members respectively to those of the other, and a heating unit supporting stove top removably mounted on said frame, said second-mentioned member being joined to and supported by said top.

5. In a device of the class described, a supporting frame, an electrical conductor supported thereby, a heating unit supporting stove top supported by said frame, said stove top having a part for supporting an electric control device, electrical connector receptacles carried by said part and by said frame, and connectors extending from the receptacles on said frame to those on said part.

6. A stove of the class described, comprising a frame, electrical conductors supported thereby, a stove top removably mounted on said frame, a heating unit receiver supported by said stove top, contacts on said receiver, a heating unit having electrodes coöperating with said contacts, an electric terminal carrying member carried by said stove top, terminals on said last-named member and connected to said contacts, and means for connecting said conductors and said terminals.

7. A stove of the class described, comprising a frame, electric supply conductors, connector receptacles for said conductors, said conductors and receptacles being carried by said frame, a stove top removably mounted on said frame, electric heating elements carried by said top, connector receptacles carried by said top and connected to said elements, and connectors fitting in and connecting said receptacles.

8. A stove of the class described, comprising a frame, electric supply conductors, fuse clips attached to said frame and connected to said supply conductors, a stove top removably mounted on said frame, fuse clips carried by said top, electric heating elements carried by said top and connected to the said clips carried thereby, and fuses connecting said clips.

9. In combination with an electric stove comprising a supporting frame, a removable and replaceable stove section including a heating element and wiring for supplying current thereto, said wiring having terminal members, electrical conductors permanently mounted in said stove, and removable and replaceable connectors adapted to electrically connect said conductors and said terminals upon being positioned, whereby an electrical stove is provided the interior wiring of which is removable with a section thereof and adapted to be connected to a source of energy by the mere placing of a connecting member.

10. A stove of the class described, comprising a frame, electrical supply conductors, connector contacts for said conductors, said conductors and contacts being carried by said frame, a stove section removably mounted on said frame and including a heating element, and supply wiring therefor together with connector contacts for said wiring, and removable and replaceable connectors extending from said first named contacts to said last named contacts.

11. A stove of the class described, comprising a frame, electrical supply conductors, connector contacts for said conductors, said conductors and contacts being carried by said frame, a stove section removably mounted on said frame and including a heating element, and supply wiring therefor, together with electrical control devices connected to said wiring and also contacts connected to said devices, and removable and replaceable connectors extending from said first named contacts to said last named contacts.

12. A stove of the class described, comprising an electric-supply-conductor supporting member, a heating unit supporting member supported adjacent thereto for removal thereawayfrom, conductor receiving receptacles on each member formed to removably accommodate electric conductors, and electric conductors extending from the receptacles of one member to those of the other.

13. A stove of the class described, comprising a frame, electric supply conductors, connector clips attached to said frame and connected to said supply conductors, a stove top removably mounted on said frame, connector clips carried by said top and electric heating elements carried by said top and connected to said clips carried thereby, and connectors connecting said clips.

In testimony whereof, I have signed my name to this specification.

JAMES LAWRENCE.

---

Corrections in Letters Patent No. 1,177,253.

It is hereby certified that in Letters Patent No. 1,177,253, granted March 28, 1916, upon the application of James Lawrence, of New York, N. Y., for an improvement in "Electric Heating Devices," errors appear in the printed specification requiring correction as follows: Page 1, line 99, for the reference-numeral "5" read *6;* page 2, line 124, for the word "adaptions" read *adaptations;* and that the said Letters Patent should be read with these corrections therein that the same may conform to the record of the case in the Patent Office.

Signed and sealed this 18th day of April, A. D., 1916.

[SEAL.]

R. F. WHITEHEAD,

*Acting Commissioner of Patents.*

Cl. 219—19.